US012070998B2

(12) United States Patent
Brunner et al.

(10) Patent No.: US 12,070,998 B2
(45) Date of Patent: Aug. 27, 2024

(54) ELECTRIC DRIVE UNIT FOR A MOTOR VEHICLE

(71) Applicant: BPW Bergische Achsen KG, Wiehl (DE)

(72) Inventors: Dominik Brunner, Berg TG (CH); Urs Steiner, Bronschhofen (CH)

(73) Assignee: BPW Bergische Achsen KG, Wiehl (DE)

( * ) Notice: Subject to any disclaimer, the term of this patent is extended or adjusted under 35 U.S.C. 154(b) by 402 days.

(21) Appl. No.: 17/626,557

(22) PCT Filed: Jul. 7, 2020

(86) PCT No.: PCT/DE2020/100595

§ 371 (c)(1),
(2) Date: Jan. 12, 2022

(87) PCT Pub. No.: WO2021/008654

PCT Pub. Date: Jan. 21, 2021

(65) Prior Publication Data

US 2022/0234438 A1 Jul. 28, 2022

(30) Foreign Application Priority Data

Jul. 12, 2019 (DE) ..................... 10 2019 118 967.5

(51) Int. Cl.

*F16H 57/04* (2010.01)
*B60K 11/02* (2006.01)

(Continued)

(52) U.S. Cl.

CPC ............ *B60K 11/02* (2013.01); *B60K 17/046* (2013.01); *F16H 57/0409* (2013.01);

(Continued)

(58) Field of Classification Search

CPC B60K 11/02; B60K 17/046; B60K 2001/001; B60K 2001/006;

(Continued)

(56) References Cited

U.S. PATENT DOCUMENTS 5,443,130 A 8/1995 Tanaka et al.
7,059,443 B2 6/2006 Kira (Continued)

FOREIGN PATENT DOCUMENTS

CN 103 730 980 4/2014
CN 103 825 404 5/2014

(Continued)

*Primary Examiner* — Jacob S. Scott
*Assistant Examiner* — Farhana Pervin
(74) *Attorney, Agent, or Firm* — Gudrun E. Huckett

(57) ABSTRACT

The invention relates to an electric drive unit for a motor vehicle, said drive unit comprising: an electric drive (5); a gearbox (6) connected downstream of the electric drive (5) in the power flow direction and located in a gearbox housing (4); means for circulating coolant in the interior (7) of the gearbox housing (4); and a rotatably mounted input or output shaft (19, 18) of the gearbox (6); wherein the gearbox housing (4) is composed of a housing shell (11), which annularly surrounds a central axis (A), and an end wall (13), and wherein the end wall (13) extends radially outwards from an opening (17) for the input or the output shaft (19, 18) as far as a connecting region (14) in which the end wall (13) and the housing shell (11) are connected to one another. In order to improve the flow conditions using design measures, in particular in those areas of the gearbox housing in which the coolant is discharged or suctioned out of the gearbox housing during circulation of same, an annular chamber (33) is provided which extends in the circumferential direction along the connecting region (14) and which is connected to the interior (7) via individual openings (40).

20 Claims, 5 Drawing Sheets

(51) Int. Cl.
*B60K 17/04* (2006.01)
*B60K 1/00* (2006.01)

(52) U.S. Cl.
CPC .... *F16H 57/0412* (2013.01); *B60K 2001/001* (2013.01); *B60K 2001/006* (2013.01)

(58) Field of Classification Search
CPC . B60K 2001/003; B60K 1/00; F16H 57/0409; F16H 57/0412; F16H 57/04
See application file for complete search history.

(56) References Cited

U.S. PATENT DOCUMENTS

| | | | | |
|---|---|---|---|---|
| 2011/0130238 | A1 | 6/2011 | Schoon | |
| 2011/0192245 | A1 | 8/2011 | Shioiri et al. | |
| 2011/0207570 | A1* | 8/2011 | Tanaka | F16H 37/082 475/150 |
| 2015/0057125 | A1* | 2/2015 | Pump | F16H 48/08 475/160 |
| 2019/0154149 | A1* | 5/2019 | Gruber | B60K 1/00 |
| 2021/0394600 | A1* | 12/2021 | Absenger | H02K 7/116 |
| 2022/0006354 | A1* | 1/2022 | Wang | H02K 7/116 |

FOREIGN PATENT DOCUMENTS

| | | |
|---|---|---|
| CN | 105 276 153 | 1/2016 |
| CN | 106 655 632 | 5/2017 |
| CN | 107 763 194 | 3/2018 |
| CN | 109 109 651 | 1/2019 |
| DE | 102 54 572 | 3/2004 |
| DE | 10 2012 112 379 | 6/2014 |
| JP | 179224 | 11/1923 |
| JP | 2011116338 | 6/2011 |
| JP | 2011185283 | 9/2011 |
| JP | 2015 086 926 | 5/2015 |
| JP | 2016 070 358 | 5/2016 |
| WO | 2007/013642 | 2/2007 |

* cited by examiner 3
5
29
26
19
17c
18
15
1
2
M
A
25
13
14
11
4
6
16
12
A

A
19

17c
18
A
7
11
30b
12
12a
4
27
26
33
40
30a 17c
13a
A
17
18
19
13
50
51
26

4
60

41
40
41
40
30a
26
11
7

ELECTRIC DRIVE UNIT FOR A MOTOR VEHICLE

BACKGROUND OF THE INVENTION

The invention relates to an electric drive unit for a motor vehicle, having an electric drive, a transmission which is connected downstream of the electric drive in the power flow direction and is arranged in a transmission housing, means for circulating cooling liquid in the interior of the transmission housing, and a rotatably arranged input or output shaft of the transmission, wherein the transmission housing is comprised of a housing shell, which annularly surrounds a central axis, and of an end wall, and wherein the end wall extends radially outward from an opening for the input or the output shaft as far as a connecting region in which the end wall and the housing shell are connected to each other.

An electric drive unit of this type is used as a traction drive of a vehicle. It is preferably used as part of an electric drive axle for a utility vehicle. In this type of vehicle axle, a multi-stage transmission is connected downstream of the electric drive, which is arranged close to the center of the vehicle for weight advantages. The transmission is arranged by itself or else together with the electric drive in a housing which is comprised of a housing shell enclosing the interior of the transmission, including the transmission elements arranged therein, and an end wall closing the interior on the end side. The housing shell is predominantly annular. The end wall extends substantially radially and is provided centrally with an opening through which the transmission input shaft or the transmission output shaft leads.

In order to cool the transmission elements, cooling liquid is circulated in the interior of the transmission housing, this taking place in a circuit in which the cooling liquid flows as far as possible through all the mechanically loaded regions of the transmission, including the rolling bearings present for the rotating transmission elements. The cooling liquid used is preferably a transmission oil, and this liquid therefore lubricates the transmission elements and also transports away heat.

In particular if the transmission is designed as a planetary gearing, the transmission oil is intensely rotated on the inner side of the housing shell. The rotation of the oil causes the formation of an oil sump running annularly around the inner side of the transmission housing. In the case of an injection-type lubrication system, this makes the ideal drainage of the lubricant difficult. In particular, in the course of the circulation of the oil, extraction of the oil by suction is made difficult since, due to this rotation, the oil flows at a high speed past the oil drain which is provided, instead of fully entering the latter.

The invention is based on the object of using structural measures to improve the flow conditions, in particular in those regions of the transmission housing in which, over the course of the circulation of the cooling liquid, the latter is removed, or extracted by suction, from the transmission housing.

SUMMARY OF THE INVENTION

In order to achieve this object, an electric drive unit comprising an annular chamber which extends in the circumferential direction along the connecting region and is connected to the interior via individual openings is proposed.

An additional annular chamber, which is connected to the interior of the transmission housing only via individual openings, is used here for calming the cooling liquid flowing or rotating at high speed in other regions of the transmission housing. For the cooling liquid, the annular chamber has the function of a calming zone. For this purpose, the annular calming zone is preferably arranged on a large diameter. The annular calming zone is open toward the interior on certain circumferential portions, namely in the region of the individual openings, such that cooling liquid and in particular transmission oil can flow via these openings into the annular chamber and is calmed therein. On other circumferential portions, by contrast, the annular chamber is substantially closed in relation to the transmission interior, and therefore, in these circumferential regions, no substantial exchange of cooling liquid takes place, and the fluid and especially the flow thereof in these regions of the annular chamber can be calmed. As a result of calming the flow, the extraction of the oil by suction or the drainage of oil is substantially improved, in particular if the space conditions in the region of the extraction of the oil by suction are in any case dimensioned tightly.

According to a preferred refinement of the annular calming zone, it is advantageous if the openings alternate with opening-free circumferential portions in the circumferential direction. For example, there can be in each case six to ten openings and opening-free circumferential portions of the annular chamber.

With regard to the annular chamber used as calming zone, it is proposed that the wall of the annular chamber is formed partially by the housing shell and partially by the end wall, the end wall being a partition between the transmission and the electric motor of the drive unit.

In order for the annular chamber to be arranged on a large diameter, it is proposed that the diameter of the annular chamber is larger than the largest diameter which the inner side of the housing shell has outside the region of the annular chamber.

Furthermore, it is proposed that the annular chamber is delimited toward the interior by an inner chamber wall, and toward the outer side of the housing shell by an outer chamber wall, wherein the openings and the opening-free circumferential portions are located in or on the inner chamber wall.

According to a refinement which is advantageous especially in terms of production, the inner chamber wall is crenellated, wherein the crenellations form the opening-free circumferential portions, and the circumferential regions between the crenellations form the openings. The axial extent of the openings, i.e., the extent thereof in the direction of the axis, is preferably smaller than the axial length of the annular chamber.

With regard to the cross-sectional geometry of the annular chamber, it is furthermore proposed that the length of the annular chamber in the axial direction is greater than the maximum width of the annular chamber, as measured between the inner and the outer chamber wall.

Preferably, bores or channels are provided in the housing shell, which lead from the annular chamber as far as the outer side of the housing shell. In conjunction with the guiding of the coolant, these bores or channels can be used for different functions and purposes. For example, the outer ends of the bores or channels can be provided with a thread in order thus to arrange a vent valve, a vent filter, a measuring plug for detecting the cooling liquid level, a magnetically operating catch device for metal chips, or a temperature sensor in the respective bore or in the respective channel. One of the bores or channels, preferably located at the lowest point of the annular chamber, serves for letting out or discharging the transmission oil into a collector arranged below.

Since the functions linked to the bores or channels sometimes need a relatively large amount of space, it is proposed by a further refinement that the housing shell is formed around the annular chamber as a flange which is widened radially in relation to the remaining housing shell, and that the bores or channels lead through the flange as far as the outer side thereof. The additional volume which is connected to the radially widened flange can therefore be usable for obtaining space for sufficiently large bores or channels, and space for the technical intended purposes associated with these bores or channels.

In addition, the flange can be used for the screw connection of the transmission housing, for example to the directly adjacent motor housing of the electric drive. For this purpose, it is advantageous if the flange is provided with axial openings, which are arranged distributed over its circumference, for receiving screws or threaded bolts, for example threaded bolts as rigid connecting elements between transmission housing and motor housing.

In order to obtain particularly favorable flow conditions in the region of the calming zone, it is proposed that the end wall is provided with a collar extending into the annular chamber, and that the transition between the radially extending part of the end wall and the collar is designed as a rounded portion. The radius of this rounded portion is preferably between 25% and 75% of the maximum width of the annular chamber, as measured between the inner chamber wall and the outer chamber wall.

The wall of the annular chamber, to the extent that the wall is formed by the housing shell, is a U-shaped wall of a groove which is open toward the end wall.

The groove which is open toward the end wall creates the possibility, on the end wall, of integrally forming a collar which extends into the annular chamber, wherein the collar lies against one of the walls of the groove, preferably against the radially outer wall of the groove.

In this refinement, the groove not only has the task of calming the coolant flow, but the groove is at the same time a centering element in order to fix the end wall in the connecting region in a precise alignment on the housing shell. For this mutual alignment, it is additionally advantageous if the collar or centering collar integrally formed on the end wall lies against the corresponding wall of the groove with the interposition of at least one annular seal, and thus a liquid-tight connection between end wall and housing shell is achieved in the connecting region.

The seal is preferably inserted into a sealing groove which is formed in the collar or centering collar.

With a refinement of the electric drive unit, it is proposed that the transmission is a planetary gearing, the ring transmission of which is the inner side of the housing shell that is provided with a toothing. The toothing is designed as a helical toothing in such a manner that the cooling liquid which has accumulated in the toothing is transported in the direction of the longitudinal portion of the housing shell that has the openings.

BRIEF DESCRIPTION OF THE DRAWINGS

Further advantages and details of the electric drive axle for a utility vehicle emerge from the description below of an exemplary embodiment which is reproduced in the drawing. In detail.

DESCRIPTION OF PREFERRED EMBODIMENTS

Figure 1:
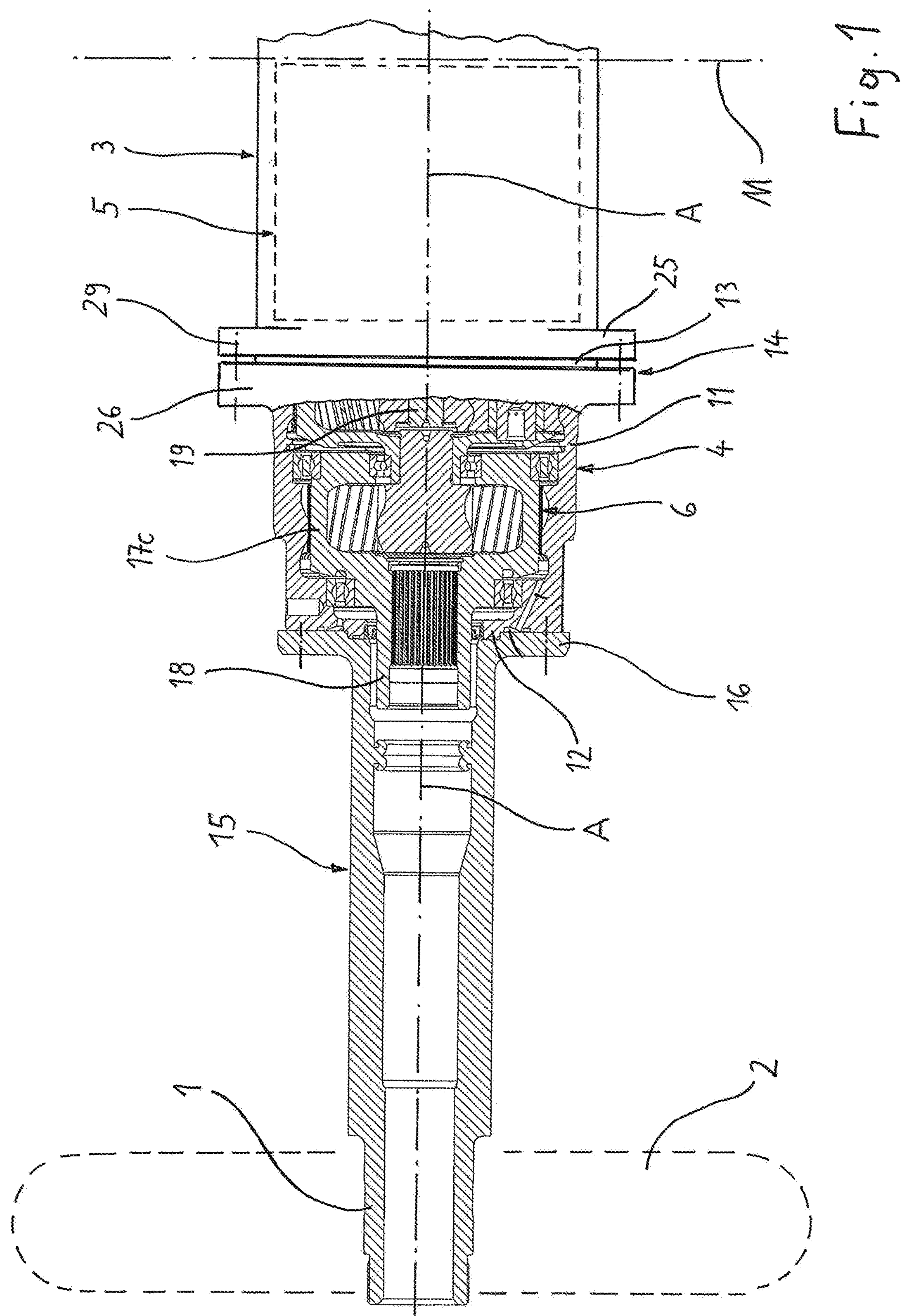
FIG. 1: shows an electric drive axle for a utility vehicle with a multi-stage transmission in the form of a double planetary gearing, a transmission housing receiving the transmission, a motor housing placed on this transmission housing, and an axle housing likewise placed on the transmission housing.
Figure 2:
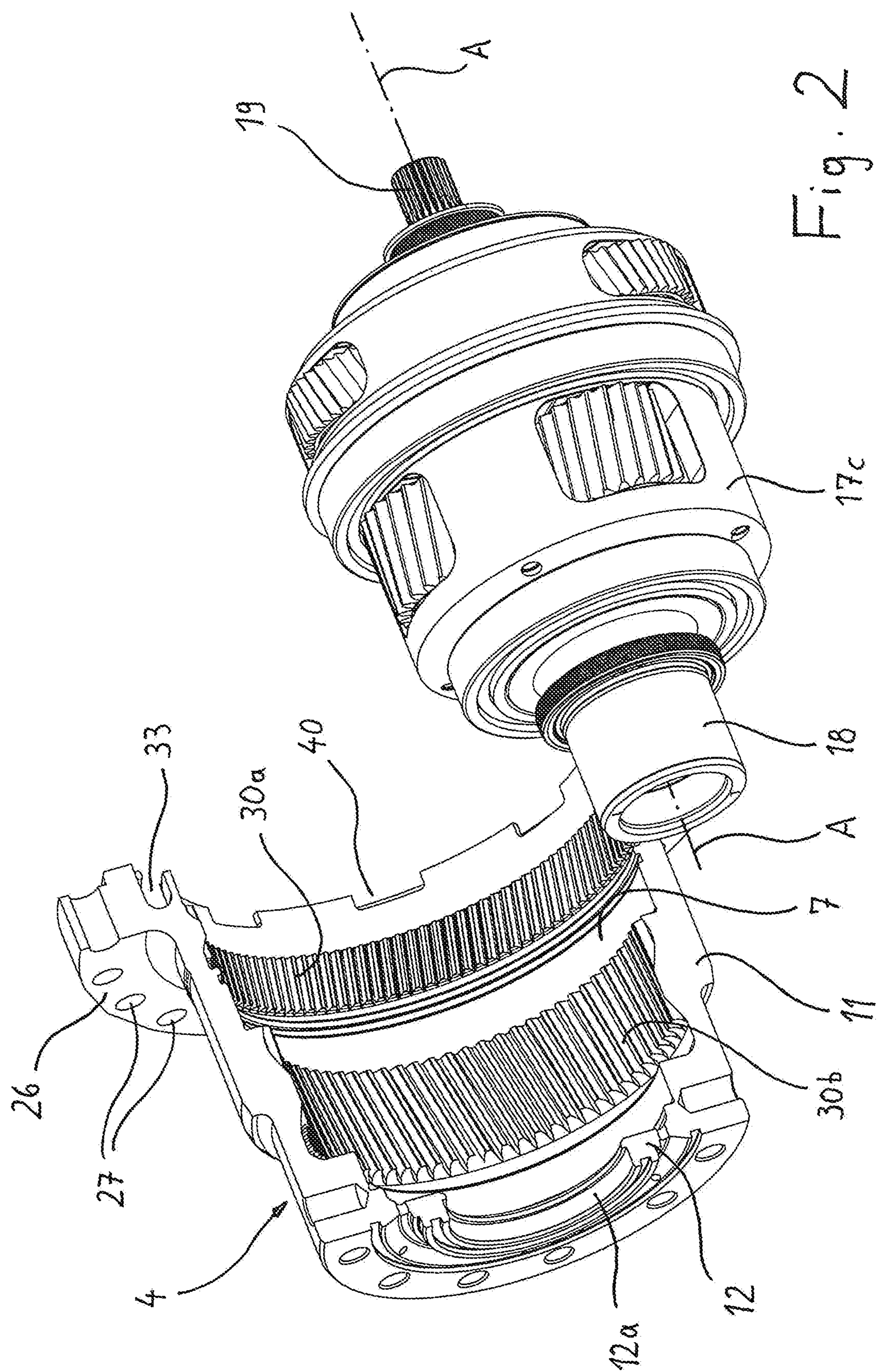
FIG. 2: shows a perspective partial section of the transmission housing, together with a planet carrier of the transmission.

FIG. 1 shows, in an overview illustration, the one half of an electric drive axle for a motor vehicle. The illustrated half of the axle is used for driving a vehicle wheel 2 which is mounted rotatably on a steering knuckle 1 and is illustrated by dashed lines at the left edge of FIG. 1. The similarly configured second half of the drive axle is symmetrically located on the other side of the vehicle center plane M indicated in FIG. 1, and carries the respective vehicle wheel of the other side of the vehicle. The electric drive axle in its entirety is a rigid axle which is continuous from the one side of the vehicle to the other.

For each side of the vehicle, and therefore for driving the respective vehicle wheel 2, an electric drive 5, in particular an electric motor, is provided in the vicinity of the vehicle center plane M. A transmission 6, here in the form of a two-stage planetary gearing, is connected downstream of each electric motor toward the outer side of the vehicle.

The two electric drives are situated in a common motor housing 3 which can be in the form of one part or multiple parts. Each transmission 6 is situated in a transmission housing 4 which is flange-mounted on the motor housing 3.

The transmission housing 4 is assembled, inter alia, from a substantially cylindrical housing shell 11, the inner side 7 of which annularly surrounds the transmission elements of the transmission 6, and from an end wall 12 which is integral with the housing shell 11. The end wall 12 is predominantly closed, but leaves a transmission opening 12*a* free in its center, through which the transmission output shaft 18, rotating on the central axis of rotation A, of the transmission 6 leads.

Also at its other end, the transmission housing 4 is provided with an end wall 13 which is, however, a separate component. In a connecting region 14 encircling circularly, this end wall 13 and the housing shell 11 are connected fluid-tightly to each other.

In its center, the end wall 13 is provided with an opening 17 through which the input shaft 19 of the transmission leads. Said input shaft 19 of the transmission can be at the same time the motor output shaft, and it likewise rotates on the axis A.

The end wall 13 extends radially outward from the opening 17 for the transmission input shaft 19 as far as the connecting region 14 in which the end wall 13 and the housing shell 11 are connected fluid-tightly to each other.

The transmission output shaft 18 leading out of the other end wall 12 can be connected for conjoint rotation, preferably via splines, to a drive shaft which leads to the vehicle wheel 2 and drives the latter. The drive shaft rotates in a tubular axle housing 15 of the drive unit which likewise extends on the central axis A. The axle housing 15 is fastened to the end wall 12 by means of a flange 16.

The axle housing 15 is provided at its vehicle-outer end with the steering knuckle 1. In addition, the brake carrier of the vehicle brake, preferably the brake carrier of a disk brake, is fastened to the axle housing 15. Axle guiding elements, for example a longitudinal link and optionally a transverse link of the vehicle axle, are likewise fastened to the axle housing 15.

For fastening the axle housing 15 to the transmission housing 4, the axle housing 15 is provided at its vehicle-inner end with a radially widened flange 16. The flange 16 is rigidly screwed against the end wall 12 of the transmission housing 4 by means of a plurality of screws.

The connection of the motor housing 3 accommodating the electric drive 5 and of the transmission housing 4 also takes place by means of screw connections, for which purpose the respective ends of these housing parts are designed as radial flanges 25, 26 which are fixedly connected to one another via screws which lead through axial openings 27 in the flange 26 of the transmission housing 4.

The transmission housing 4 not only has the function of a housing, but it is also itself part of the epicyclic or planetary gearing by a helical toothing 30*a*, which is arranged around the axis of rotation A, of the first transmission stage and, offset axially, a helical toothing 30*b*, which is arranged around the axis of rotation A, of the second transmission stage being formed on the inner side 7 of the housing shell 11. Each of the two helical toothings 30*a*, 30*b* therefore in each case forms the ring transmission of the planetary gearing concerned. The alignment or oblique position of the teeth of the helical toothing 30*b* is opposed to the teeth of the first helical toothing 30*a*. The planet wheels of the two transmission stages of the planetary gearing mesh with the helical toothings.

The remaining transmission elements of the planetary gearing are arranged in a planet carrier which rotates on the axis A and is inserted as a preassembled transmission carrier 17*c* into the transmission housing 4. The central element of the transmission carrier 17*c* is the transmission output shaft 18 which rotates on the axis A and protrudes out of the likewise centrally arranged transmission opening 12*a* of the transmission housing 4.

The cooling of the transmission 6 and of its sometimes heavily loaded teeth, pinions and bearings takes place by means of a cooling liquid which is circulated by a pump. The cooling liquid is preferably a transmission oil, and therefore the liquid both lubricates the transmission elements and also transports away heat.

The design in the form of a planetary gearing causes cooling liquid and lubricating fluid to be held as the result of centrifugal forces outward by the planet wheels against the helical toothings 30*a*, 30*b*. The cooling liquid therefore accumulates on the inner side 7 of the housing shell 11, and at the same time a strong rotation of the liquid takes place along this inner side 7. The liquid has to be caught and made available again to the cooling and lubricating process by the liquid being transported back into more central regions of the transmission and into the region of rolling bearings, for example to the rolling bearings of the transmission input shaft 19 and of the transmission output shaft 18.

During active circulation cooling, the oblique position of both gear wheels 30*a*, 30*b* causes a scoop effect, which is directed toward the end wall 13, on the coolant, in association with a rotation of the transmission oil along the inner side 7. Only in the event of a passive sump cooling is the orientation of the gear wheel 30*b* reversed such that then a scoop effect directed toward the end wall 12 also occurs.

As a result of the rotation of the transmission oil on the inner side 7 of the transmission housing, a powerfully flowing oil sump is formed there which, if no additional measures as previously described are taken, would make the ideal drainage of the lubricant and cooling difficult. This is because the flow which arises would make the extraction of the transmission oil by suction, which is necessary in the course of the circulation, difficult if the transmission oil were to flow at a high flow speed past the oil drain which is present, instead of fully entering the oil drain.

The solution to this problem resides in providing an annular chamber 33 which preferably surrounds the axis A circularly and extends in the circumferential direction along that connecting region 14 in which the end wall 13 is fastened to the housing shell 11. It is important that the annular chamber 33 is connected to the interior 7 of the transmission housing only via individual openings 40. The openings 40 have been distributed uniformly over the inner circumference of the annular chamber 33.

The annular chamber 33 is used for calming the cooling liquid which flows at high speed in other regions of the transmission housing and powerfully rotates especially along the inner wall. For the cooling liquid, the annular chamber 33 therefore has the function of a calming zone which is open toward the interior 7 only on certain circumferential portions, namely in the region of the individual openings 40, such that the cooling liquid or the transmission oil flows via these openings 40 into the annular chamber 33 and is calmed therein.

On other circumferential portions, by contrast, the annular chamber 33 is substantially closed in relation to the transmission interior 7 such that, on these other circumferential portions, no substantial exchange of liquid takes place and the liquid flow along these regions of the annular chamber 33 that are closed toward the transmission interior can be calmed. The calming of the flow leads to improved extraction of the oil by suction or to an improved drainage of oil, which takes place directly out of the annular chamber 33, for example by a channel which opens into the annular chamber at the lowest point of the annular chamber 33 and through which the liquid can flow off downward to a collector.

In order that the annular chamber 33 forms the calming zone, the openings 40 alternate with opening-free circumferential portions 41 in the circumferential direction of the annular chamber. There is an equal number of openings 40 and of opening-free circumferential portions 41; in the exemplary embodiment, there are six openings 40 over the circumference and analogously six opening-free circumferential portions 41.

The diameter of the annular chamber 33 is larger than the largest diameter which the inner side 7 of the housing shell 11 has outside the region of the annular chamber 33.

By the annular chamber 33 extending along that connecting region 14 in which the end wall 13 is fastened to the housing shell 11, the wall of the annular chamber 33 is formed partially by the housing shell 11 and partially by the end wall 13.

The annular chamber 33 is delimited toward the interior 7 by an inner chamber wall 44 and toward the outer side of the housing shell 11 by an outer chamber wall 45. The openings 40 and the opening-free circumferential portions 41 are located in or on the inner chamber wall 44.

In a simple manner in terms of production, the inner chamber wall 44 is crenellated, wherein crenellations which extend parallel to the central axis A form the opening-free circumferential portions 41, and the circumferential portions between the crenellations form the openings 40. The crenellations and also the opening-free circumferential portions 41 arranged between the crenellations are configured rectangularly in a radial view of the inner chamber wall 44.

The wall of the annular chamber 33, to the extent that this wall is formed by the housing shell 11 and not by the end wall 13, is a U-shaped wall which runs circularly around the axis A and is in the form of a groove open toward the end wall 13. The length of this groove and the length of the annular chamber 33 in the direction of the axis A is greater than the maximum width of the annular chamber 33, as measured between the inner chamber wall 44 and the outer chamber wall 45.

The axial extent of the openings 40, i.e., the extent thereof in the direction of the axis A, is smaller than the axial length of the annular chamber 33.

The opening-free circumferential sections 41 extend axially in the direction of the end wall 13 to such an extent that either they are in contact with the inner side 13*a* of the end wall 13, or here only a small gap remains via which no or substantially no liquid exchange is possible.

The end wall 13 separates the transmission 6 from the electric drive 5. On its side facing the transmission 6, the end wall 13 is provided with a collar 50 which extends at a right angle to the main extent of the end wall 13 and serves inter alia as a centering collar. The collar 50 is an integral part of the end wall 13. It is of such an axial length that it extends into the annular chamber 33. For centering purposes, the collar 50 lies with its outer side radially against the outer chamber wall 45 with the interposition of a seal 51. In the exemplary embodiment, the axial length of the encircling centering collar is approximately half of the axial extent of the annular chamber 33.

Since the connection region 14 has to be liquid-tight, the collar 50 lies radially against the chamber wall 45 with the interposition of the annular seal 51. The seal 51 is inserted into a sealing groove on the outer side of the collar 50.

Figure 3:
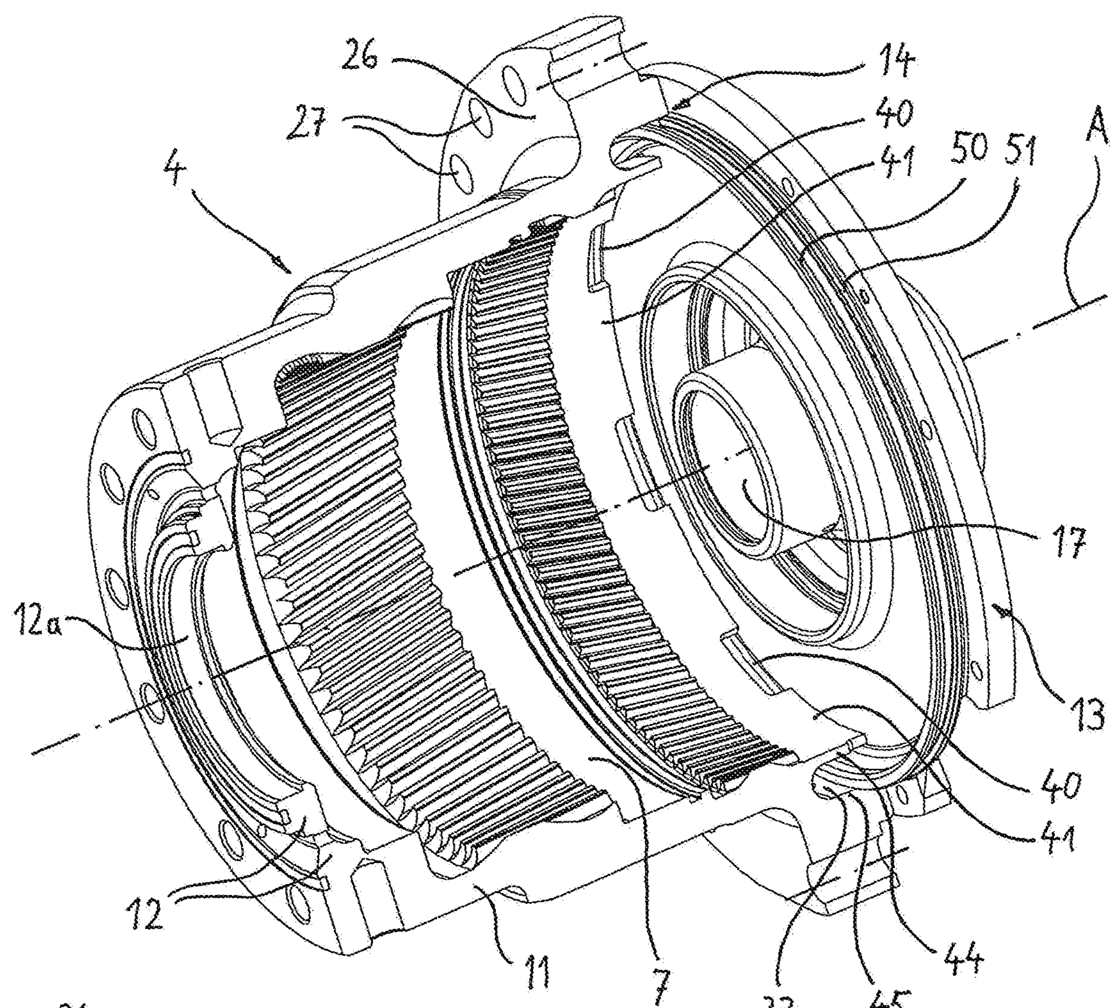
FIG. 3: shows a perspective partial section of the transmission housing, together with an end wall arranged between the transmission housing and the motor housing.
Figure 3A:
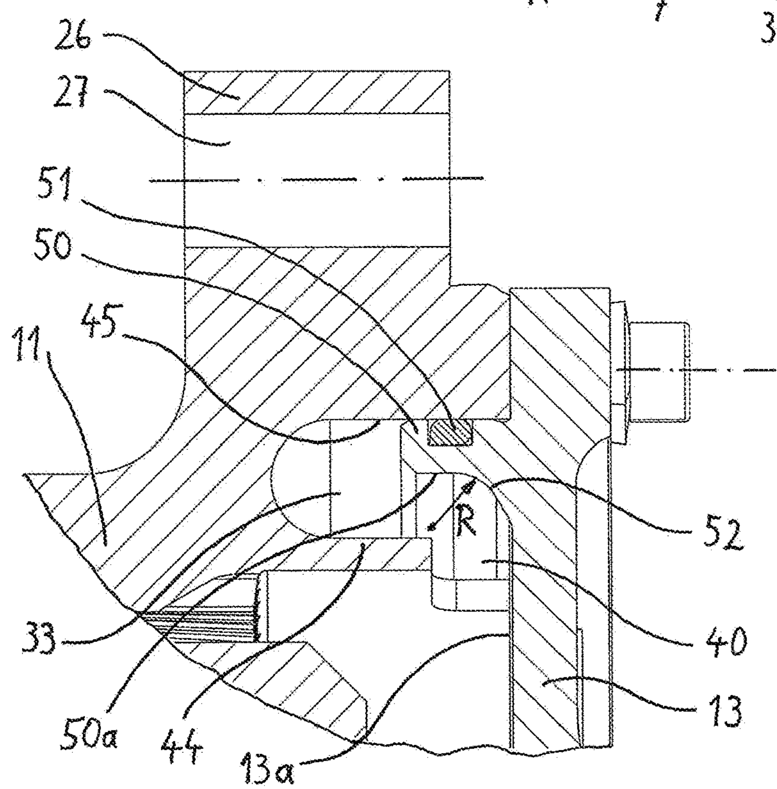
FIG. 3*a*: shows an enlarged detail of the connecting region from FIG. 3.
Figure 4:
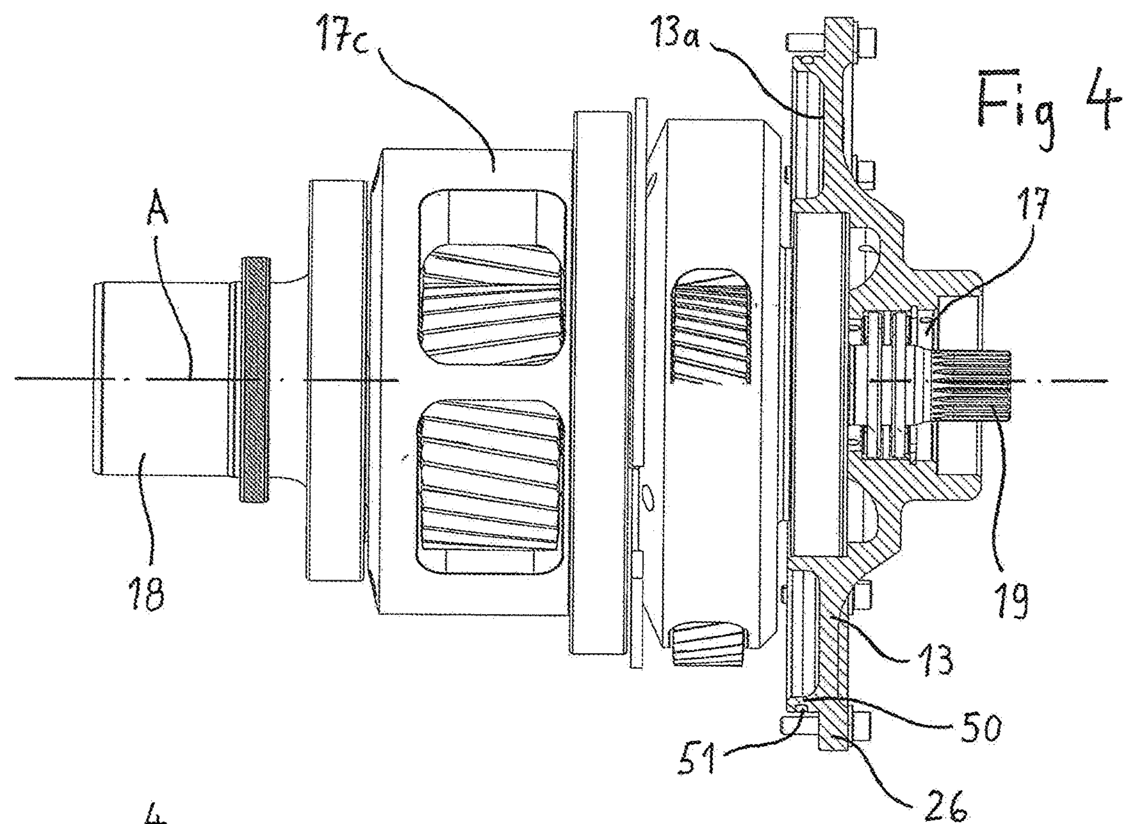
FIG. 4: shows a longitudinal section through parts of the transmission and through the end wall, but without the transmission housing.
Figure 5:
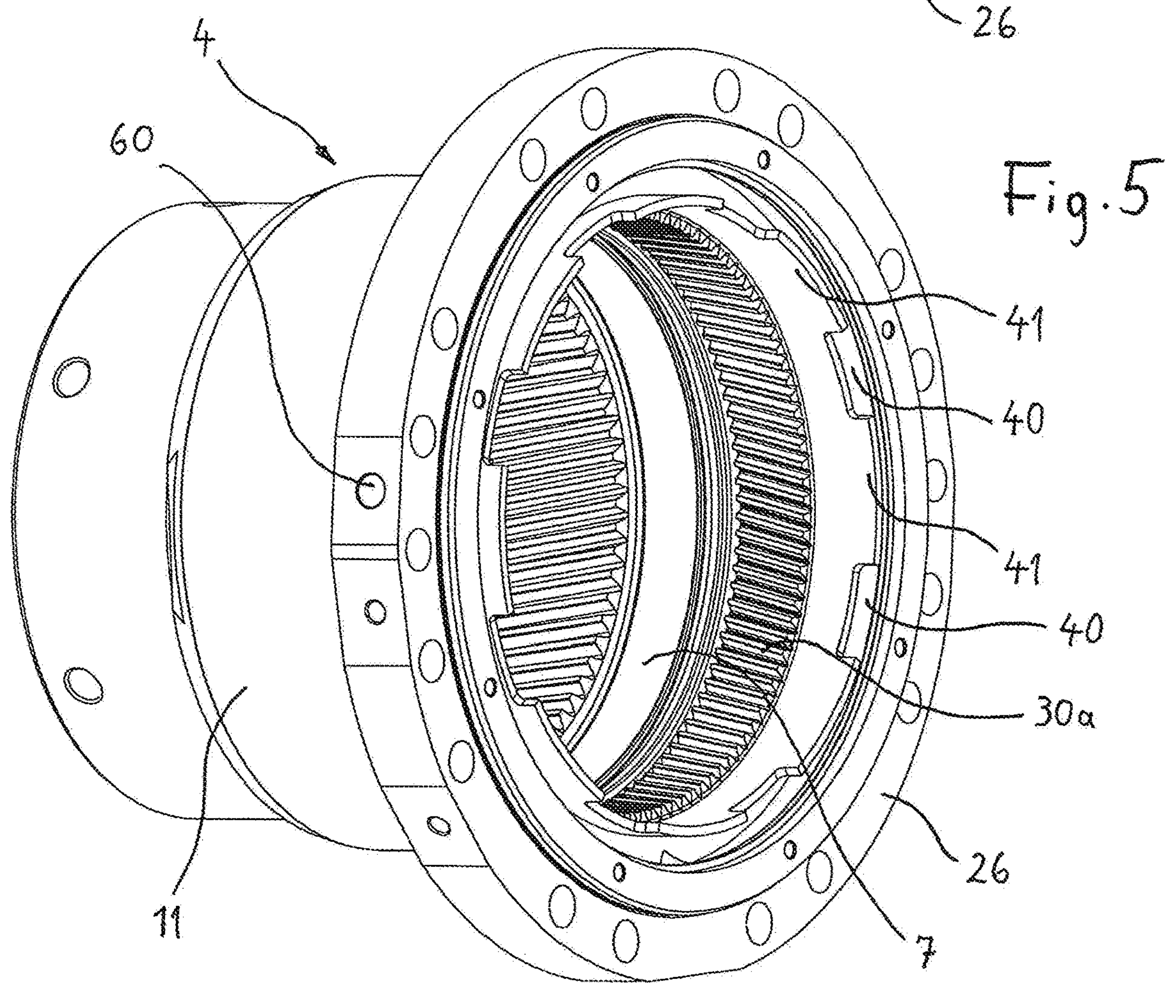
FIG. 5: shows a further perspective view of the transmission housing from a different viewing angle.
Figure 6:
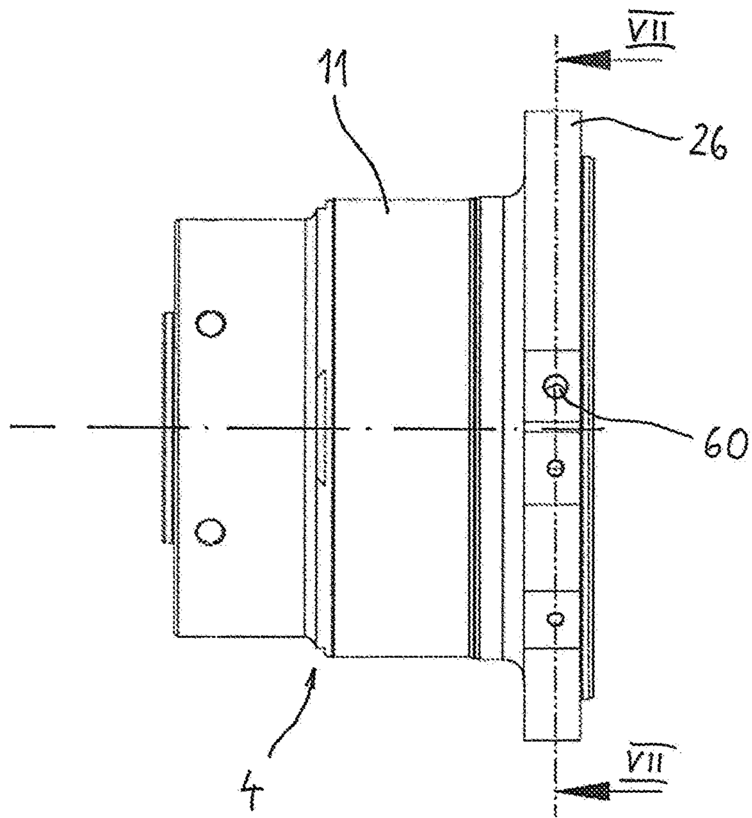
FIG. 6: shows a side view of the transmission housing.
Figure 7:
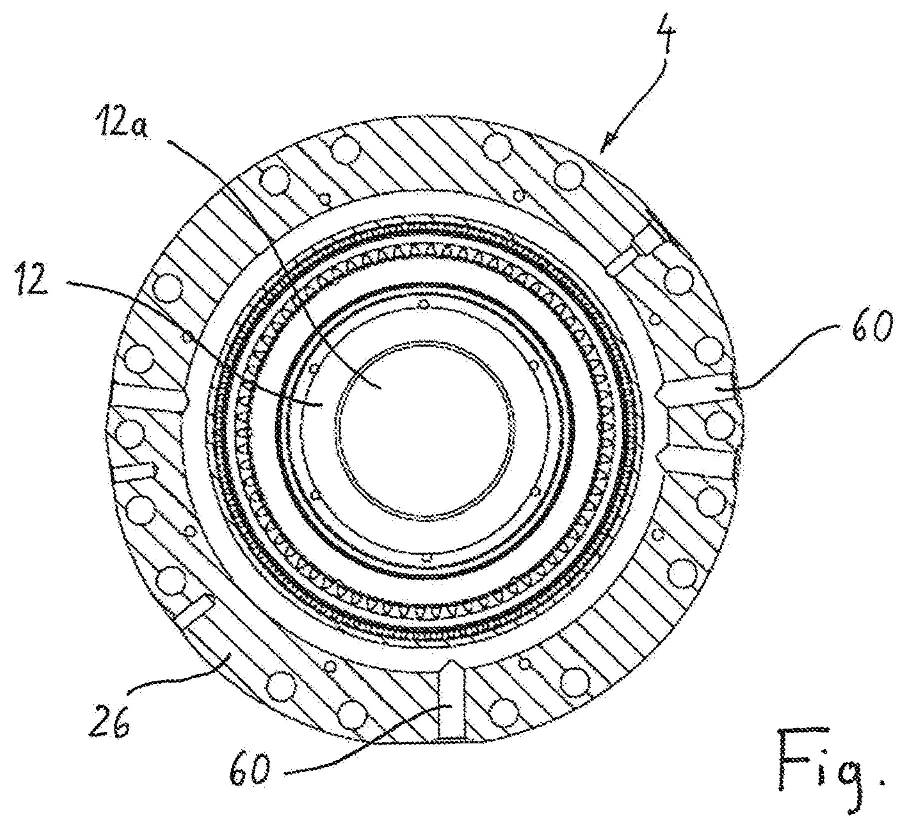
FIG. 7: shows a section through the transmission housing according to the section plane VII-VII denoted in FIG. 6.

According to FIG. 3*a*, the transition between the inner side 13*a* of the end wall 13 extending transversely with respect to the central axis A and the inner side 50*a* of the collar 50 is designed as a rounded portion 52, and preferably as a 90° rounded portion with a radius R of the rounded portion 52 that is between 25% and 75% of the maximum width of the annular chamber 33 between the inner chamber wall 44 and the outer chamber wall 45. The design of the transition in the form of a rounded portion 52 leads to improved guidance of the flow on the annular chamber 33.

A plurality of radially running bores and channels 60 lead from the annular chamber 33 onto the outer side of the housing shell 11 and in particular onto the outer side of the flange 26 of the transmission housing since the flange 26 is arranged around the annular chamber 33.

One of the radial bores or channels 60 is an oil drain via which the transmission oil which has accumulated in the annular chamber 33 and has been calmed therein can drain downward to a collector. For this reason, this bore or this channel is located at the lowest point of the flange 26.

Further bores or channels 60 can be used in conjunction with the guiding of the coolant for different functions and purposes. For example, they can receive a vent valve, a vent filter, a measuring plug for detecting the cooling liquid level in the transmission, a magnetically operating catch device for metal chips which have accumulated in the liquid, or a temperature sensor for sensing the oil temperature.

Since the bores or channels 60 are not located in the rather thin-walled part of the transmission housing, but rather in the region of the radially widened flange 26 of the transmission housing, there is sufficient space here for such additional functional components. For example, the outer ends of the bores or channels 60 can be provided with a thread into which the respective functional component is screwed from the outside.

The bores or channels 60 are located on those circumferential portions of the flange 26 on which the flange does not have any of the axial openings 27.

LIST OF REFERENCE CHARACTERS

1 Steering knuckle
2 Vehicle wheel
3 Motor housing
4 Transmission housing
5 Electric drive
6 Transmission
7 Inner side
11 Housing shell
12 End wall
12*a* Transmission opening
13 End wall
13*a* Inner side of end wall
14 Connecting region
15 Axle housing
16 Flange
17 Opening
17*c* Transmission carrier
18 Transmission output shaft
19 Transmission input shaft
25 Flange
26 Flange
27 Axial opening
30*a* Helical toothing
30*b* Helical toothing
33 Annular chamber
40 Opening
41 Opening-free circumferential portion
44 Inner chamber wall
45 Outer chamber wall
50 Collar, centering collar
50*a* Inner side of collar
51 Seal
52 Rounded portion
60 Bore, channel
A Axis, axis of rotation
M Vehicle center line
R Radius

What is claimed is:

1. An electric drive unit for a motor vehicle, comprising:

an electric drive (5);

a transmission housing (4) comprising a housing shell (11), annularly surrounding a central axis (A) of the electric drive unit, and further comprising an end wall (13) comprising an opening (17) and extending radially outwardly from the opening (17) as far as a connecting region (14) of the end wall (13), wherein the end wall

(13) and the housing shell (11) are connected to each other at the connecting region (14);

a transmission (6) arranged in an interior of the transmission housing (4) and connected to the electric drive (5) downstream in a power flow direction, wherein the transmission (6) comprises a rotatably arranged input or output shaft (19, 18) extending through the opening (17) of the end wall (13) of the transmission housing (4);

means for circulating a cooling liquid in the interior (7) of the transmission housing (4);

an annular chamber (33) extending in a circumferential direction along the connecting region (14) and connected to the interior (7) of the transmission housing (4) via individual openings (40).

2. The electric drive unit as claimed in claim 1, wherein the individual openings (40) are arranged distributed uniformly about an inner circumference of the annular chamber (33).

3. The electric drive unit as claimed in claim 2, wherein the individual openings (40) alternate with opening-free circumferential portions (41) of an inner chamber wall (44) of the annular chamber (33) in the circumferential direction.

4. The electric drive unit as claimed in claim 3, wherein six to ten of the individual openings (40) and six to ten of the opening-free circumferential portions (41) are provided.

5. The electric drive unit as claimed in claim 1, wherein the annular chamber (33) comprises a wall formed partially by the housing shell (11) and partially by the end wall (13).

6. The electric drive unit as claimed in claim 5, wherein a portion of the wall of the annular chamber (33) that is formed by the housing shell (11) is a U-shaped wall of a groove, wherein the groove is open toward the end wall (13).

7. The electric drive unit as claimed in claim 6, wherein the end wall (13) comprises a collar (50) extending into the annular chamber (33) and resting against a wall portion of the U-shaped wall of the groove.

8. The electric drive unit as claimed in claim 7, wherein the wall portion of the U-shaped wall of the groove against which the collar (50) is resting is a radially outer wall of the U-shaped wall of the groove.

9. The electric drive unit as claimed in claim 7, further comprising at least one annular seal (51), wherein the collar (50) rests against the wall portion of the U-shaped wall of the groove with interposition of the at least one annular seal (51).

10. The electric drive unit as claimed in claim 9, wherein the at least one seal (51) is inserted into a sealing groove formed in the collar (50).

11. The electric drive unit as claimed in claim 1, wherein the annular chamber (33) surrounds the central axis (A) circularly, and wherein a diameter of the annular chamber (33) is larger than a largest diameter of an inner side of the interior (7) in a region outside of the annular chamber (33).

12. The electric drive unit as claimed in claim 1, wherein the annular chamber (33) is delimited toward the interior (7) by an inner chamber wall (44) and is further delimited toward an outer side of the housing shell (11) by an outer chamber wall (45), wherein the individual openings (40) and the opening-free circumferential portions (41) are located in or on the inner chamber wall (44).

13. The electric drive unit as claimed in claim 12, wherein the inner chamber wall (44) comprises crenellations forming the opening-free circumferential portions (41).

14. The electric drive unit as claimed in claim 12, wherein a length of the annular chamber (33) in an axial direction is greater than a maximum width of the annular chamber (33) measured between the inner chamber wall (44) and the outer chamber wall (45).

15. The electric drive unit as claimed in claim 12, wherein the housing shell (11) comprises bores or channels (60) leading from the annular chamber (33) as far as the outer side of the housing shell (11).

16. The electric drive unit as claimed in claim 15, wherein the housing shell (11) comprises a flange (26) formed around the annular chamber (33), wherein the flange (26) widens radially in relation to a remaining part of the housing shell (11), and wherein the bores or channels (60) lead through the flange (26) as far as an outer side of the flange (26).

17. The electric drive unit as claimed in claim 16, wherein the flange (26) comprises axial openings (27) distributed about a circumference of the flange (26) and configured to receive screws or threaded bolts.

18. The electric drive unit as claimed in claim 12, wherein the end wall (13) comprises a collar (50) extending into the annular chamber (33), and wherein a transition between a radially extending part of the end wall (13) and the collar (50) is designed as a rounded portion (52).

19. The electric drive unit as claimed in claim 18, wherein a radius (R) of the rounded portion (52) is between 25% and 75% of a maximum width of the annular chamber (33) measured between the inner chamber wall (44) and the outer chamber wall (45).

20. The electric drive unit as claimed in claim 1, wherein the transmission (6) is a planetary gearing comprising a ring transmission comprising a toothing (30*a*), wherein the ring transmission comprising the toothing (30*a*) forms an inner side of the housing shell (11), wherein the individual openings (40) are provided in a longitudinal portion of the housing shell (11), wherein the toothing (30*a*) is a helical toothing configured to transport the cooling liquid which accumulates in the toothing (30*a*) toward the longitudinal portion of the housing shell (11) provided with the individual openings (40).

* * * * *